May 31, 1966 G. E. SCHIENLE 3,253,665
FLUID ACTUATED WORKPIECE POSITIONING DEVICE
Filed Jan. 6, 1961 2 Sheets-Sheet 1

INVENTOR
GORDON E. SCHIENLE

BY J. J. Loucek
ATTORNEY

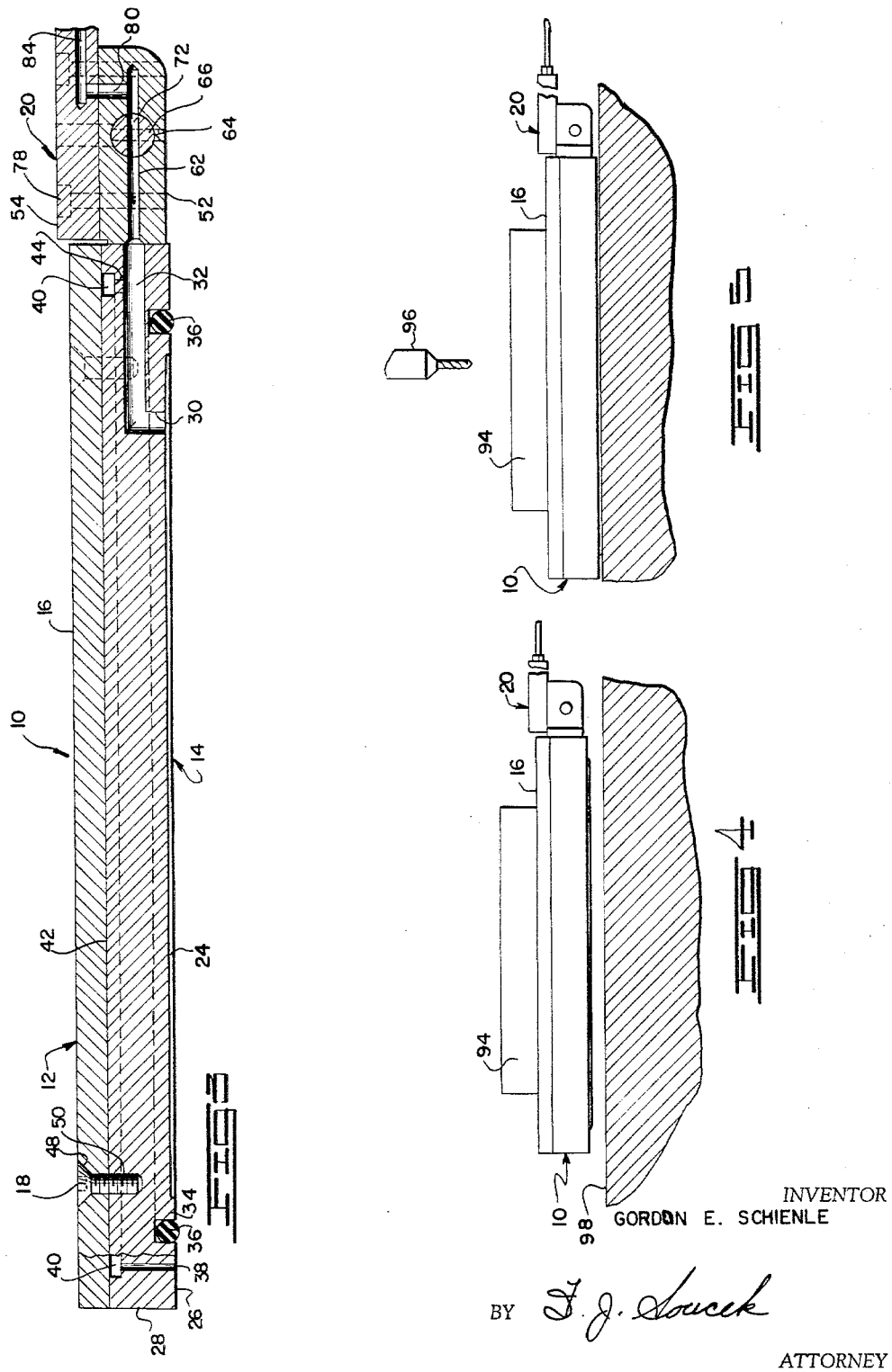

United States Patent Office

3,253,665
Patented May 31, 1966

3,253,665
FLUID ACTUATED WORKPIECE POSITIONING DEVICE
Gordon E. Schienle, Burlington, Wis., assignor to General Motors Corporation, Detroit, Mich., a corporation of Delaware
Filed Jan. 6, 1961, Ser. No. 81,103
5 Claims. (Cl. 180—7)

This invention relates generally to a workpiece support and, more specifically to a workpiece support incorporating fluid means for purposes of moving the support and for purposes of maintaining the support in a fixed position.

During machining operations an operator frequently is confronted with the problem of positioning an excessively heavy fixture or jig below a machine tool spindle. When a situation of this sort arises the operator must often utilize separate apparatus for handling the heavy workpiece that is difficult to manipulate and position below the machine spindle. In addition, once the workpiece is positioned, a problem arises of securely maintaining the workpiece stationary so as to permit machining operation that can be held within close tolerances.

The present invention alleviates the aforementioned problems by not only facilitating movement of a heavy workpiece from one location to another, but in addition, incorporates means for maintaining the workpiece in a fixed position so as to assure accurate machining. This is accomplished through a workpiece positioning device having a generally flat support portion with a cavity formed in the base section thereof. The cavity can be connected through a valve block to a source of vacuum. Surrounding the cavity is a series of orifices each of which connect to a common passage which is adapted to communicate through the valve block with a source of high pressure fluid. The arrangement is such that by manually operating a control valve located in the valve block, the cavity or the orifices can alternately be connected to the vacuum source or the high pressure source respectively. When the device is connected to the vacuum source the former is securely fixed in position to permit accurate machining of any workpiece mounted on the device. When the surrounding orifices are connected to the pressurized fluid, the force of the fluid emanating from the orifices serves to provide a lifting force on the device thereby facilitating movement thereof.

An object of the present invention is to provide a workpiece positioning device that can be fixed in position or moved from one position to another through the use of vacuum and pressurized fluid respectively.

Another object of the present invention is to provide a workpiece support that can accommodate heavy jigs or fixtures and be easily movable therewith through the use of high pressure fluid.

Another object of the present invention is to provide a movable workpiece support that can accommodate heavy jigs or fixtures and be fixed in position beneath a machine spindle by vacuum so as to permit an accurate machining operation.

A further object of the present invention is to provide a workpiece support that can be movable by high pressure fluid from one position to another or can be fixed in position by vacuum; both of the occurrences being controlled through a hand-operated slidable valve member that is readily accessible by an operator.

For purposes of illustrating the invention, it will be further described with reference to the accompanying drawing in which:

FIGURE 3 is an enlarged sectional view of the subject invention taken on lines 3—3 of FIGURE 2.

FIGURE 4 shows the subject invention being lifted from a base table when connected to a source of pressurized fluid.

FIGURE 5 shows the subject invention sealingly engaging the base table when connected to a source of vacuum.

Figure 1:
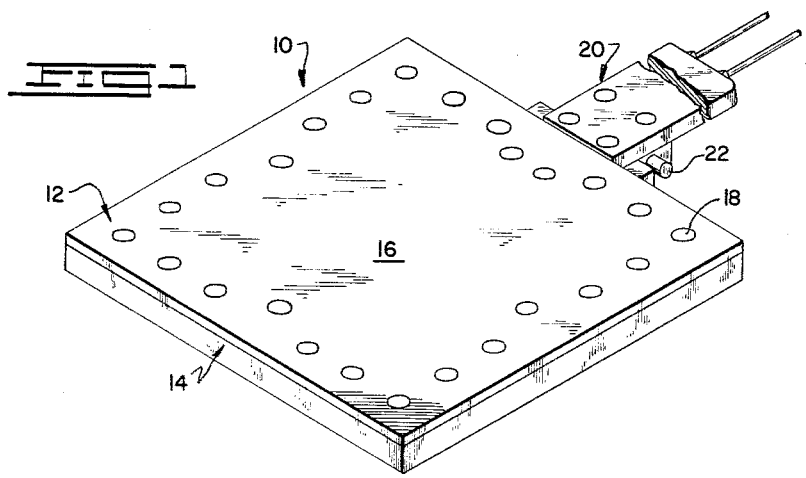
FIGURE 1 is a perspective view of the subject invention showing the workpiece support surface and the controlling valve block.

Referring to FIGURE 1, a perspective view of the subject invention is shown wherein the numeral 10 relates, in general, to a workpiece supporting portion which comprises an upper plate section 12 and a base plate section 14. The upper plate section 12 has a flat surface 16 that serves as a seat or support for a workpiece that can be secured thereto in the customary manner prior to a machining operation. Each of the sections consist of a generally square plate of metal of identical border measurements, with the upper plate section 12 being superimposed on and suitably fastened to the base plate section 14 by a plurality of screws 18. A valve block 20 is attached to one side of the workpiece support portion 10 and includes a manually shiftable valve member 22. The valve member 22 controls the admission of pressurized fluid or vacuum into the workpiece supporting portion 10 from the reservoirs 90, 92, shown in FIGURE 2, for purposes which will hereinafter be described.

Figure 2:
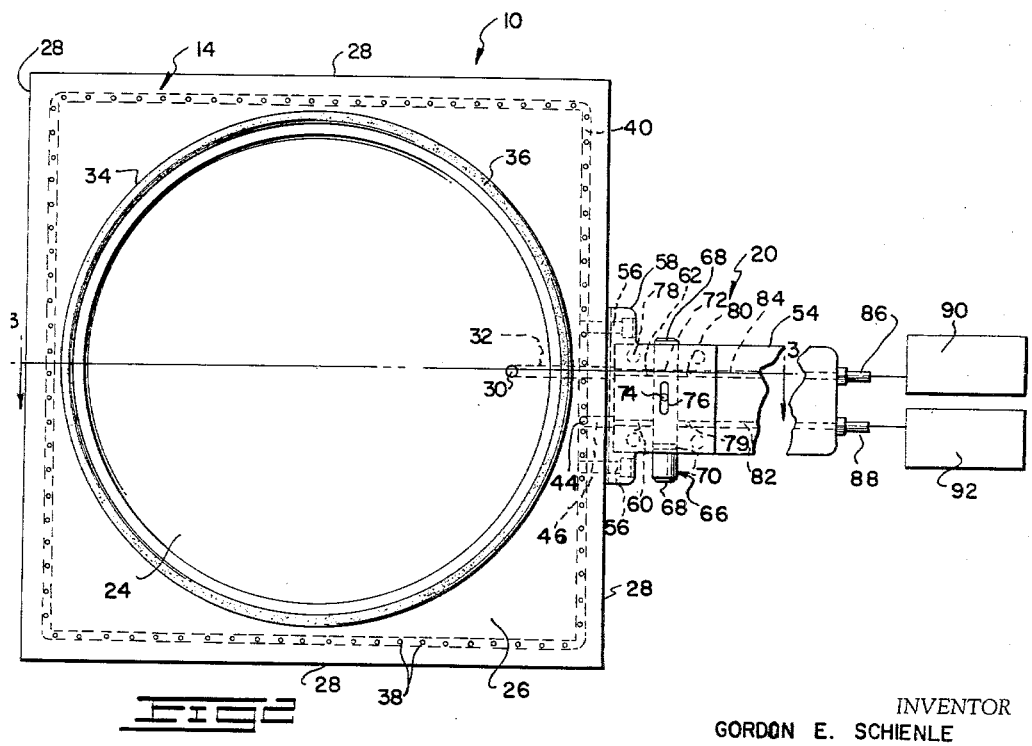
FIGURE 2 is a plane view of the subject invention illustrating the underside thereof, and the valve block connecting with the vacuum and high pressure source.

For a more detailed description of the subject invention, attention is now directed to FIGURE 2 which shows the workpiece support portion 10 and the valve block 20 with the base plate section exposed and facing the observer. As shown in FIGURE 2, a generally circular cavity or recessed portion 24 is formed in the flat surface 26 of the base plate section 14. The circular cavity 24 is centrally formed in the surface 26 with the peripheral edge of the cavity being equidistant from each of straight sides 28 at the points of intersection of a line passing through the diameter of the cavity and the arcuate portion of the cavity. A transverse port 30 is formed in the cavity 24 and is met by longitudinally extending passage 32 that terminates at the side 28 of the base plate section 14. The passage 32 connects with an aligned passage 62 in the valve block 20 for purposes hereinafter described.

An annular groove 34, having a generally square configuration in cross-section, encircles the cavity 24, and is also formed in the flat surface 26 of the base plate section 14. The groove 34 lies on a circle having a common center with the cavity 24, and serves to accommodate an O-ring 36 as shown in FIGURE 3. The O-ring 36 is of a cross-sectional size that permits a press-fit with the side walls of the groove 34 for retaining purposes, and allows a part of the peripheral edge of the O-ring 36 to extend beyond the flat surface 26. A plurality of equally spaced orifices 38 open to the surface 26 adjacent to and extending in a line parallel to each of the base plate section sides 28. As viewed in FIGURE 3, each of the orifices 38 extend transversely into the body portion of the base plate section 14, and connect with a common passage 40. The passage 40 is located in vertical alignment with the orifices 38, and is formed in the top surface 42 of the base plate section 14. A vertical bore 44 connects the passage 40 with a passage 46 that terminates adjacent to the passage 32 at the side 28 of the base plate section 14.

The structure as above described is closed on the one face 42 by the upper plate section 12 as shown in FIGURE 3. As aforementioned, the upper plate section 12 consists of a rectangular plate conforming in configuration to the base plate section 14. The upper plate section 12 has a plurality of countersunk holes 48 drilled therethrough for purposes of accommodating fastening screws 18 which are receivable by aligned tapped bores 50 in the base plate section 14. The sections 12 and 14 are secured together in sealing engagement to provide a closed passage 40, and to permit the combined sections to function as a unit for supporting a workpiece.

Attached to the workpiece support portion 10 is a valve block generally indicated by the numeral 20. As best shown in FIGURES 2 and 3 the valve block 20 consists of a lower or fastening portion 52 and a handle portion 54. The fastening portion 52 is attached to the base plate section 14 by a pair of screws 56 that pass through appropriate apertures in laterally extending arms 58. The fastening portion 52 includes a high pressure fluid passage 60 and a vacuum passage 62 both of which are interrupted partially by a transverse bore 64. A cylindrical valve member 66 is slidably seated within the transverse bore 64 formed in the fastening portion 52 of the valve. The ends 68 of the valve member 66 serve as finger-operating portions for manually shifting the valve member 66 between two extreme positions. A pair of axially extending passages 70, 72 are drilled in the valve member 66 and are adapted to connect with the passages 60 and 62, respectively, depending upon the position of the valve member 66. A pin 74 is fixed to the valve member 66 and extends through a slot 76 formed in the underside of the fastening portion 52. The pin and slot combination serves to limit the movement of the valve member 66 for correctly aligning the appropriate passage in the valve member with the passages in the valve block. Connecting with the passages 60 and 62, respectively, are a pair of vertically disposed passages 79 and 80 which lead into the handle portion 54 of the valve block 20.

The fastening portion 52 is joined, through a plurality of suitable fastening members 78, to the handle portion 54 so that the inner surfaces thereof are sealingly in contact. Formed within the handle portion 54 are a pair of axially extending passages 82 and 84 which are respectively connected through vertical passages 79, 80 to the passages 60, 62 formed in the fastening portion 52. The passage 84 in the handle portion 54 connects through a conduit 86 to a source of vacuum stored in the reservoir 90. Similarly, the passage 82 is connected through a conduit 88 to a source of high pressure fluid contained in the reservoir 92. The outer configuration of the valve block assembly 20, as is readily apparent from the drawings, is designed to enable an operator to grasp the valve block assembly with his hand and simultaneously regulate and control the valve member 66 through the use of his fingers.

The operation of the subject invention is as follows:

Assuming a heavy workpiece 94 is secured to the support surface 16, as shown in FIGURES 4 and 5, and it is desired to position the workpiece beneath a machine tool spindle 96 for a machining operation, the required movement can be greatly facilitated with the subject invention. The operator simply grasps the handle portion 54 and through the use of one of his fingers slides the valve member 66 so as to align the passage 70 thereof with the passage 60 formed in the fastening portion 52. When this occurs a flow of compressed air emanating from the reservoir 92 will pass through the conduit 88, through the passages 82, 79, 60 and 70 into the passage 46 in the workpiece support 10. The fluid will then flow into the rectangular passage 40 and emit through each of the orifices 38 formed in the face 26 of the base plate section 14. The orifices 38 will direct the compressed air downwardly against the table 98 causing a lifting reaction on the workpiece support 10 that will greatly decrease the force required to move the latter. At this time the operator can easily reposition the combined workpiece support 10 and the workpiece 94 from one location to another beneath the machine tool spindle 96.

When the workpiece 94 is in the desired position with respect to the machine tool spindle 96, the operator can manually shift the valve member 66 into the position shown in FIGURE 2 whereupon the vacuum located in the reservoir 90 is connected with the cavity 24 through the conduit 86, passages 84, 80, 72, 62, 32 and 30. The shifting of the valve member 66 disconnects the high pressure fluid with the work support followed by a connection of the vacuum source with the workpiece support 10. This action results in the workpiece support 10 seating on the table 98 followed by a gripping action caused by the vacuum existing in the cavity 24. To assure a sealing engagement between the workpiece support 10 and the cavity 24, the portion of the O-ring 36 extending from the annular groove 34 makes contact with the table 98. The workpiece support 10 is now in a fixed position and permits an accurate machining operation to be conducted on the workpiece 94. Movement of the workpiece support 10 to a new position is accomplished in a manner as aforedescribed when the valve member 66 is moved from the position shown in FIGURE 2 to a position wherein the passage 70 is aligned with the high pressure passage 60.

It should be understood that although I have described my invention in some detail, modifications and variations may be made in the form and arrangement of parts without departing from the spirit of my invention. I do not therefore wish to be limited to the exact structure herein shown and described but claim as my invention all forms thereof coming within the scope of the appended claims.

What is claimed is:

1. A movable work support comprising an upper plate member having a flat surface for supporting a workpiece and a base plate member having a planar seating surface for cooperating with a planar base surface, a passage formed in the top surface of said base plate member extending around the periphery thereof, said upper plate member and said base plate member being secured together in sealing engagement to close said passage and to permit said upper plate member and said base plate member to function as a unit for supporting said workpiece, a substantially circular cavity formed in said planar seating surface of said base plate member, a source of vacuum selectively controlled by a first valve means connected to said cavity for retaining said base plate member to said planar base surface, a plurality of orifices formed in said base plate member and disposed adjacent said cavity, said orifices connected to said passage, and a source of high pressure fluid selectively controlled by a second valve means connected to said passage to deliver high pressure fluid to said orifices for raising said work support free from said planar base surface to facilitate movement of said work support from one position to another.

2. The device as set forth in claim 1 wherein means are provided for sealing said cavity to said planar base surface when said cavity is connected to said vacuum source.

3. In combination, a movable work support having a workpiece supporting member, a plate member secured to said supporting member, said plate member having a planar seating surface for cooperating with a planar base surface, a vacuum source and a high pressure fluid source, said plate member having a cavity exposed to said planar base surface, a plurality of orifices formed in said plate member and disposed adjacent said cavity, means for selectively connecting said vacuum source to said cavity for retaining said plate in a fixed position and means for selectively connecting said high pressure fluid source to said orifices for directing a fluid under pressure from said high pressure source toward said planar base surface for raising said work support to facilitate movement thereof.

4. In combination, a movable work support having a workpiece supporting member, a plate member secured to said supporting member, said plate member having a planar seating surface for cooperating with a planar base surface, a vacuum source, a high pressure fluid source and vacuum and high pressure fluid control means, said plate member having a cavity exposed to said planar base surface, a plurality of orifices formed in said plate member and disposed adjacent said cavity, said vacuum source selectively connected to said cavity for retaining said work support in a fixed position, said high pressure fluid source selectively connected to said orifices for directing fluid under pressure from said high pressure source toward said planar base surface for raising said work support to facilitate movement thereof, said vacuum source and said high pressure fluid source selectively controlled by said vacuum and said high pressure control means, said control means being dispsoed adjacent to said work support and secured thereto to permit ready accessibility by the operator.

5. The device as set forth in claim 4 wherein said control means includes a valve block assembly having a manually slidable valve member, said valve block assembly being designed to permit an operator to manually grasp said valve block assembly and simultaneously operate said slidable valve member to control said vacuum source and said high pressure fluid source.

References Cited by the Examiner

UNITED STATES PATENTS

| | | | |
|---|---|---|---|
| 1,698,482 | 1/1929 | Nicin | 180—7 |
| 2,879,875 | 3/1959 | Swackhamer | 112—2 |
| 2,885,915 | 5/1959 | Schurger | 77—64 |
| 2,918,183 | 12/1959 | Petersen et al. | 180—7 |
| 2,938,590 | 5/1960 | Barnett | 180—7 |
| 3,116,897 | 1/1964 | Theed. | |

OTHER REFERENCES

Machinery, vol. 80, pages 451, 452, March 13, 1952.

A. HARRY LEVY, *Primary Examiner.*

DAVID J. WILLIAMOWSKY, *Examiner.*